United States Patent [19]

DePaula et al.

[11] Patent Number: 4,753,507
[45] Date of Patent: Jun. 28, 1988

[54] PIEZOELECTRIC LOADING HOUSING AND METHOD

[75] Inventors: Ramon P. DePaula, Agoura; John Turley, Santa Monica, both of Calif.

[73] Assignee: Litton Systems, Inc., Beverly Hills, Calif.

[21] Appl. No.: 816,881

[22] Filed: Jan. 7, 1986

[51] Int. Cl.$^4$ ............................................. G02B 6/26
[52] U.S. Cl. ................................. 350/96.15; 350/400
[58] Field of Search ............. 350/96.15, 96.20, 96.29, 350/400, 403, 406, 371, 407

[56] References Cited

U.S. PATENT DOCUMENTS

| | | | |
|---|---|---|---|
| 3,625,589 | 12/1971 | Snitzer | 350/96 |
| 3,645,603 | 2/1972 | Smith | 350/149 |
| 3,827,000 | 6/1973 | Matsushita et al. | 332/7.51 |
| 3,856,378 | 12/1974 | Brandt et al. | 350/96 |
| 4,002,896 | 1/1977 | Davies et al. | 332/7.51 |
| 4,068,191 | 1/1978 | Zemon | 331/94.5 M |
| 4,086,484 | 3/1978 | Steensma | 332/7.51 |
| 4,118,676 | 10/1978 | Redman | 332/7.51 |
| 4,268,116 | 5/1981 | Schmadel et al. | 332/7.51 |
| 4,294,513 | 10/1981 | Nelson et al. | 350/96.29 |
| 4,307,937 | 12/1981 | Gordon | 350/96.29 |
| 4,335,933 | 6/1982 | Palmer | 350/96.19 |
| 4,343,532 | 10/1982 | Palmer | 350/96.19 |
| 4,386,822 | 6/1983 | Bergh | 350/96.15 |
| 4,389,090 | 6/1983 | LeFevre | 350/96.29 |
| 4,398,794 | 8/1983 | Palmer et al. | 350/96.19 |
| 4,443,700 | 4/1984 | Macedo et al. | 250/227 |
| 4,469,397 | 9/1984 | Shaw et al. | 350/96.15 |
| 4,505,587 | 3/1985 | Haus et al. | 356/345 |
| 4,586,783 | 5/1986 | Campbell et al. | 350/96.15 |

FOREIGN PATENT DOCUMENTS

De.3305104 8/1984 Fed. Rep. of Germany ... 350/96.29

OTHER PUBLICATIONS

Nosu et al., "Acousooptic Phase Modulator for Single Mode Fibers", 28C3-5, p. 316*Visiting Scientist Yokosuku ECL, NTT, Yokosuka Kanagawa, Japan-238.
Nelson et al., "Passive Techniques for Fiber Optic Sensor Systems", I.F.O.C., 3/1981, pp. 27-30.
Dandridge, et al., "Phase Compensation in Interferometric Fiber Optic Sensors", Optics Letters, vol. 7, No. 6, Jun. 1982, pp. 279-281.
Brooks, et al. "Active Polarization Coupler for Birefringent Fiber", Opt. Lett., vol. 9, No. 6, pp. 249-251.
Chen et al., "PLZT Modulators for Optical Communications", Ferroelectrics, 1980, vol. 27, pp. 73-76.
DePaula et al., "Acoustooptic all Fiber Modulator", SPIE, vol. 425, 1983.
Flanders, "Submicrometer Periodicity Gratings as Artificial Anisotropic Dielectrics", Appl. Phys. Lett., 42(6), Mar. 15, 1983, p. 492.

Primary Examiner—William L. Sikes
Assistant Examiner—Frank González
Attorney, Agent, or Firm—John H. Lynn

[57] ABSTRACT

A fiber squeezer includes a frame that applies a preload to an optical fiber to permit variation of the birefringence thereof by either increasing or decreasing the preload. The optical fiber and a piezoelectric transducer are retained in the frame, and an appropriate voltage source is connected to the piezoelectric transducer to control the force on the fiber, which controls the refractive indices of the fiber by means of the photoelastic effect. The frame may include a pair of generally L-shaped legs fastened together to enclose the piezoelectric transducer and the fiber. The relative positions of the legs are adjustable during assembly of the frame to permit application of the preload to the fiber and transducer fiber squeezer. The frame may also include a generally U-shaped member having a pair of outwardly extending legs with an end plate mounted therebetween. The transducer and the fiber are held between the end plate and the lower portion of the U-shaped member. During assembly of the frame, the position of the end plate is adjusted to compress the fiber.

11 Claims, 2 Drawing Sheets

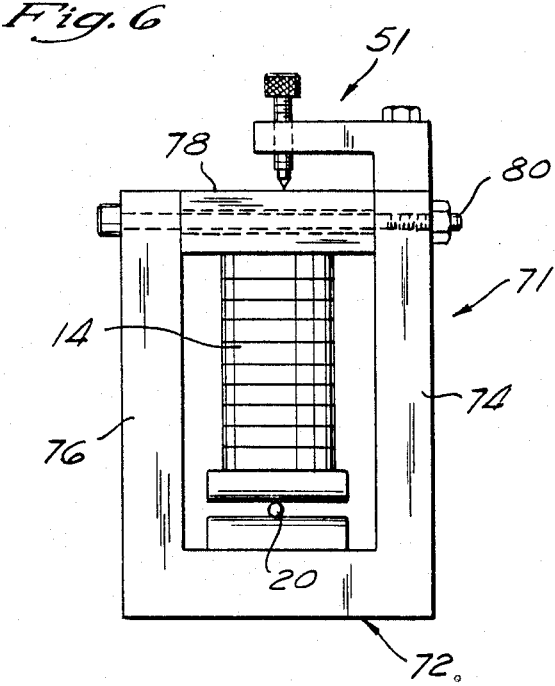
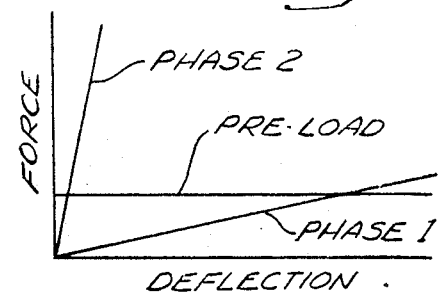
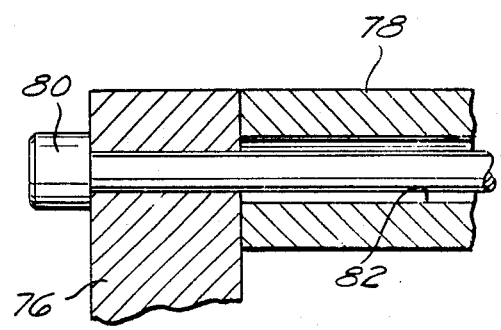
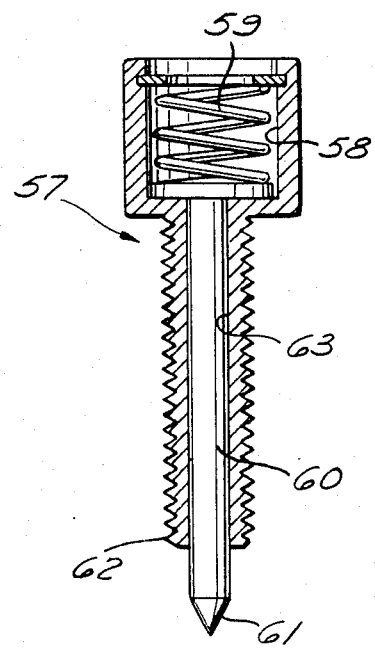
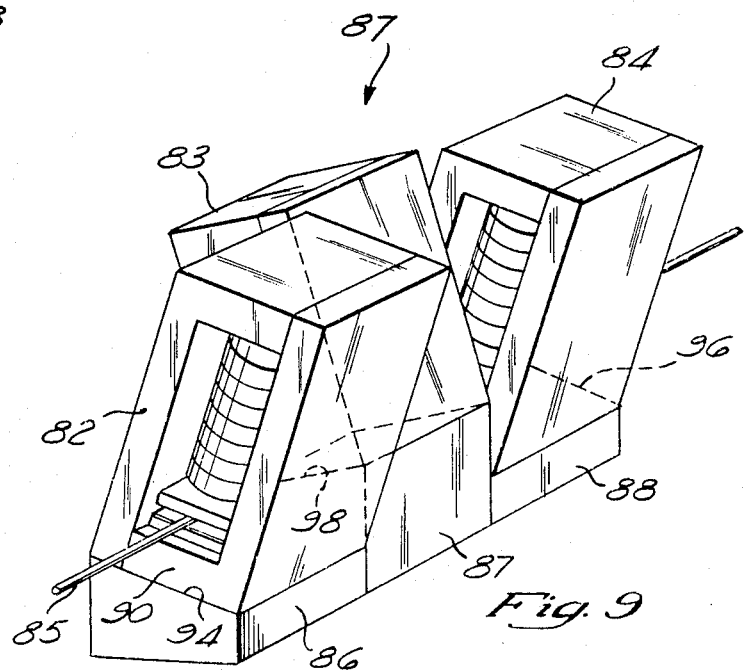

PIEZOELECTRIC LOADING HOUSING AND METHOD

BACKGROUND OF THE INVENTION

This invention relates generally to apparatus and methods for applying a force to a length of fiber optic material and particularly to apparatus and methods for compressing an optical fiber to control the refractive indices of the fiber and, therefore, the polarization of the optical wave propagating in the fiber. Still more particularly, this invention relates to a structural frame for a fiber squeezer and method of assembly thereof for applying compressional forces transverse to the length of an optical fiber to produce stress-induced birefringence for controlling the polarization of light guided by the fiber.

Some familiarity with polarization of light and propagation of light within an optical fiber will facilitate an understanding of the present invention. It is well-known that a light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The normal modes are directly related to the distributions of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attenuation. The waves having field components that propagate essentially unattenuated are the normal modes. Waves that are severely attenuated are generally called "evanescent modes". A single mode fiber will propagate only one spatial distribution of energy for a signal of a given frequency.

In describing the normal modes, it is convenient to refer to the direction of the electric and magnetic fields relative to the direction of propagation of the wave. If only the electric field vector is perpendicular to the direction of propagation, which is usually called the optic axis, then the wave is said to be a transverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode. None of the normal modes require a definite direction of the field components; and in a TE mode, for example, the electric field may be in any direction that is perpendicular to the optic axis.

The direction of the electric field vector in an electromagnetic wave is the polarization of the wave. In general, a wave will have random polarization in which there is a uniform distribution of electric field vectors pointing in all directions permissible for each mode. If all the electric field vectors in a wave point in only one particular direction, the wave is linearly polarized. If the electric field consists of two orthogonal electric field components of equal magnitude, the electric field is circularly polarized because the net electric field is then a vector that rotates around the optic axis at an angular velocity equal to the frequency of the wave. If the two linear polarizations are unequal, the wave has elliptical polarization. In general, any arbitrary polarization can be represented by either the sum of two orthogonal linear polarizations, two oppositely directed circular polarizations or two oppositely directed elliptical having orthogonal semi-major axes.

The velocity of an optical signal depends upon the index of refraction of the medium through which the light propagates. Certain materials have different refractive indices for different polarizations. A material that has two refractive indices is said to be birefringent. The polarization of the signal propagating along a single mode optical fiber is sometimes referred to as a mode. A standard single mode optical fiber may be regarded as a two mode fiber because it will propagate two waves of the same frequency and spatial distribution that have two orthogonal polarizations.

Two different polarization components of the same normal mode can propagate through a birefringent material unchanged except for a difference in velocity of the two polarizations. Circular birefringence, linear birefringence, and elliptical birefringence are each described with reference to different polarization modes. If a material exhibits circular birefringence, the polarization of a light wave is expressed as a combination of two counter-rotating components. One of the circular polarizations is referred to as "right-hand circular" while the other is referred to as "left-hand circular". In a non-birefringent material both right hand and left hand circular polarizations travel at the same velocity. The counterrotating electric field vectors of the circularly polarized components of the light represent the polarization modes for circular birefringence. If the light is linearly polarized, the circular polarization vectors are in phase with one another and are of equal amplitude. If the light is elliptically polarized, the circular polarization vectors are of unequal amplitudes. In general, elliptically polarized light may have varying degrees of ellipticity; and the polarization may range from linearly polarized at one extreme to circularly polarized at the other extreme.

In a circularly birefringent material, the velocity of propagation of one circular polarization vector is greater than the velocity of propagation of the counter-rotating polarization vector. Circular birefringence causes a wave to rotate or twist as it propagates through the medium. Similarly, in a material that is linearly birefringent, the propagation velocity of the light in one of the linearly polarized modes is greater than the propagation velocity of the light in the other normal linearly polarized mode. Elliptical birefringence results when both linear birefringence and circular birefringence exist at a point in a material through which the light wave is propagating. The elliptical birefringence affects the polarization of light in a complex manner which depends, in part, upon the relative magnitudes of the linear birefringence and the circular birefringence.

In summary, any polarized light can be represented by two circularly polarized waves having proper phase and amplitude. Alternatively, the light could be represented by either elliptically rotating components or by perpendicular linearly polarized components of electric field.

There are a number of birefringent materials. For example, depending on their structure and orientation to the light propagating through it, certain crystals are circularly birefringent; and other crystals are linearly birefringent. Other types of crystals, for example quartz, can have both circular birefringence and linear birefringence so as to produce elliptical birefringence for a light wave propagating in a properly chosen direction.

The amount of birefringence is used herein to mean the difference between the two refractive indices of a medium that guides a light wave. Controlling the amount of birefringence permits the control of the polarization of a light signal output from a length of fiber optic material. If the wave propagated by a fiber comprises two linear polarization components, increasing or decreasing the difference between the refractive indices of the fiber provides means for controlling the optical length of the fiber for each of the two polarizations. If the fiber is birefringent, then the two polarization components will be shifted in phase as they propagate along the fiber. Since the velocity of light in an optical fiber is $v = c/n$, where c is the free space velocity of light and n is the refractive index of the fiber, the polarization component having the lower refractive index will have a smaller transit time in the fiber than will the component having the higher refractive index. A birefringent medium therefore rotates the plane of polarization on an optical signal propagating therein.

It is well known that application of a compressive force to a length of optical fiber along an axis transverse to the fiber changes the refractive indices of the fiber by means of the photoelastic effect, resulting in stress-induced birefringence. Various devices for applying transverse compressive forces to optical fibers are known in the art. One such device is disclosed in SPIE Vol. 425, pp. 111-113 by DePaula et al. That device includes an optical fiber disposed between two quartz piezoelectric transducers driven in phase by an electrical signal. When the driving signal is zero, the fiber is unstressed. When the driving signal is not zero, the fiber is squeezed between the quartz plates and experiences a change in birefringence. Therefore, controlling the force applied to the fiber controls the amount of birefringence.

Another method for controlling the polarization of a light wave is disclosed in U.S. Pat. No. 4,389,090, issued June 21, 1983 to LeFevre, assignee to the Board of Trustees of Leland Stanford Jr. University. LeFevre discloses several embodiments of a polarization controller, all of which employ one or more lengths of optical fiber formed in a coil of relatively small radius to stress the fiber sufficiently to induce birefringence. Rotation of the planes of the coils through predetermined angles produces a controlled change in the polarization of light guided by the fiber.

Construction of a device such as a fiber optic rotation sensor requires precise control of the polarization of the optical signals guided by an optical fiber.

The coils disclosed by LeFevre provide adequate polarization control in some cases, however, such polarization controllers are best suited for use in static situations where the polarization is to be changed only by a predetermined amount. In a fiber optic rotation sensor two counter propagating beams of the same polarization propagate through a coiled portion of optical fiber. Optical polarizers eliminate unwanted polarizations from the system. The signal input to each polarizer first passes through a polarization controller to ensure that only light of the desired polarization is input to the polarizer to avoid unnecessary loss of signal intensity. The polarization controller of LeFevre changes any input polarization by a predetermined amount so that if the polarization of the input to the polarization controller changes, then the polarization of the signal output from the polarization controller also changes.

U.S. patent application Ser. No. 557,844 by George A. Pavlath, assignee to Litton Systems, Inc. discloses a fiber optic system including a polarizer that guides light of a desired polarization in a fiber and radiates light of an undesired polarization from the fiber. The radiated signal is incident upon a photodetector, which produces an error signal that is amplified before being input to polarization controller comprising a plurality of fiber squeezers. The fiber squeezers comprise piezoelectric actuators that apply stresses to the fiber to control the polarization of light impinging upon the polarizer. The system minimizes the error signal so that the polarization of the signal input to the polarizer is essentially the desired polarization.

Difficulties have arisen in the construction of fiber squeezers suitable for forming a polarization controller for providing light of the desired polarization for input to the polarizers in an optical rotation sensing system. To provide the desired degree of polarization control with fiber squeezers requires preloading the fiber. Application of a suitable electrical signal to an actuator permits the loading on the fiber to be either increased or decreased, which provides complete control of the birefringence of the fiber. However, the allowable deformation at room temperature is in the region of 1.0 percent before fracture occurs. For a 75μ diameter glass fiber, this deformation is only about 0.75μ. Previous devices for preloading the fiber have used wedges or screws, which lack the required precision and sensitivity to preload the fiber without substantial risk of fracturing the fiber. One such device includes an adjusting screw having about eighty threads per inch aligned with a piezoelectric actuator formed of PZT. The piezoelectric actuator acts upon a fiber held between two pressure pads. Turning the screw to advance it toward the fiber stresses the fiber.

A second such device includes a frame having a screw driven wedge oriented such that a planar surface of the wedge contacts a second wedge that holds a PZT transducer adjacent a pressure pad, which transmits force from the transducer to the fiber. Turning the screw to advance the wedge into the frame perpendicularly to the fiber compresses the transducer against the fiber to provide a preload.

SUMMARY OF THE INVENTION

The present invention provides a fiber squeezer that applies a preload to an optical fiber and a method for assembling the fiber squeezer to apply a laterally compressive preload to a fiber without the risk of fracturing the fiber. Since the fiber is preloaded, the birefringence thereof may be varied by either increasing or decreasing the compressive load beyond the preload.

The invention provides a bimodular structural system that allows a step transition between two distinct phases. One of these phases is a "soft" preloading that can be easily adjusted without fracturing the fiber. The first phase has a gentle force-deflection slope, and the second has a steep force-deflection slope. The first phase, due to its softness, allows for sensitive loading and prevents fracture of the fiber.

The other phase is a stiff system that effectively directs the signal deflections into the fiber to provide polarization control. The step transition form the first phase to the second phase is achieved by clamping action of the device applied transversely to the preload force. Since the relative geometry of the structure is maintained, system tension is undisturbed, avoiding any change or bias to the initial load.

The fiber is retained between two load pads that have surfaces contacting the fiber that are contoured for preventing fractures of the fiber. A known static preload is applied to the frame with the parts of the frame being movable to permit transmission of the preload to the fiber. The parts of the frame are secured together by suitable means so that the preload remains on the fiber.

A piezoelectric transducer is retained in a frame; and an appropriate voltage source is connected to the piezoelectric transducer to provide variation of the force on the fiber above or below the preload. Therefore, the refractive indices of the fiber are varied relative to one another by means of the photoelastic effect.

In a first preferred embodiment, the frame includes a pair of generally L-shaped members that are preferably bolted together. The legs enclose the piezoelectric transducer, the load pads, and the fiber. The bolts pass through holes in the legs that provide sufficient clearance around the bolt to permit relative longitudinal movement of the L-shaped members as the fiber squeezer is assembled. The L-shaped members are moved relative to one another to place the fiber in compression, before the bolts are tightened.

A spring plunger device is used to control the amount of preload applied to the fiber. The spring plunger device comprises a screw having a spring biased plunger projecting from the point thereof. The spring plunger device includes a mounting bracket for mounting it to a leg of the one of the L-shaped members. The screw is advanced into contact with a leg of the other L-shaped member to compress the fiber. A known force is required to compress the plunger a predetermined distance, which permits application of a known preload to the fiber.

A second embodiment of the frame includes a generally U-shaped member having a pair of outwardly extending legs. An end plate is mounted between the legs, and the transducer, the load pads and the fiber are held between the end plate and the lower portion of the U-shaped member. Bolts extend through the legs of the U-shaped member and through the end plate, which contains passages for receiving the bolts with sufficient clearance to permit movement of the end plate between the legs to compress the fiber before the bolts are tightened.

A polarization controller may be constructed with a plurality of fiber squeezers constructed according to the invention. A first fiber squeezer is placed on a base to have the axis of its piezoelectric transducer at an angle of 22.5° clockwise from the vertical, for example. A second fiber squeezer is placed on a base to have the axis of its piezoelectric transducer at an angle of 22.5° counterclockwise from the vertical such that the first and second fiber squeezers produce forces on the fiber that are at an angle of 45° to one another. A third fiber squeezer is formed essentially identically to the first fiber squeezer. The three fiber squeezers are arranged to apply forces along a length of the fiber for varying the birefringence thereof. Each fiber squeezer is formed to provide a range of advancement and retardation of $2\pi$ radians in the polarization of the signal guided by the fiber. It has been found that the above described arrangement of fiber squeezers formed according to the invention provides the capability of controlling the polarization of light guided by the fiber to produce an output having a prescribed polarization for an arbitrary input polarization.

BRIEF DESCRIPTION OF THE DRAWINGS

FIG. 5b is an enlarged view of a portion of FIG. 5a;

FIG. 5c is a cross sectional view illustrating the application of two equal, opposing line forces and resulting stresses to the optical fiber of FIGS. 5a and 5b;

FIG. 5d is a perspective view showing stresses in the fiber of FIGS. 5c and 5d;

FIG. 6 is an elevation view showing a second frame structure for a fiber squeezer constructed according to the invention and showing application of a preloading force to the frame and optical fiber;

FIG. 7 is a fragmentary cross sectional view of the fiber squeezer of FIG. 6 illustrating an adjustment feature for controlling the amount of preload applied to the fiber;

FIG. 8 is a cross sectional view of a screw for applying a preload to the optical fibers of FIGS. 1–3 and 6;

FIG. 9 is a perspective view of a polarization controller formed of three fiber squeezers according to the invention; and FIG. 10 graphically illustrates the two loaded conditions of the fiber.

DESCRIPTION OF THE PREFERRED EMBODIMENT

Figure 1:
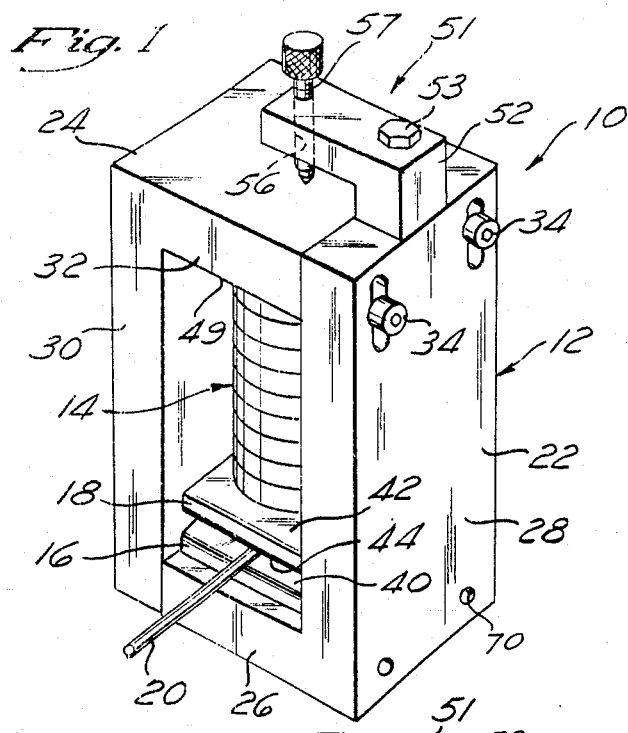
FIG. 1 is a perspective view showing the general structure of a fiber squeezer including a frame formed according to the present invention and showing an optical fiber and a piezolectric transducer retained within the frame.
Figure 2:
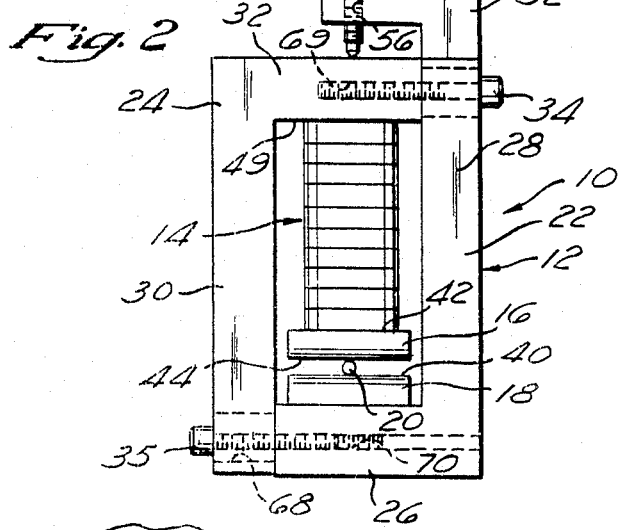
FIG. 2 is a front elevation view of the fiber squeezer of FIG. 1 showing the application of a preload to the fiber.

Referring to FIGS. 1 and 2, a fiber squeezer 10 comprises a frame 12, a piezoelectric transducer 14, a first load pad 16 and a second load pad 18. An optical fiber 20 is retained between the load pads 16 and 18 for receiving forces along the length thereof when the piezoelectric transducer 14 axially expands or contracts.

The frame 12 comprises a pair of generally L-shaped members 22 and 24. The anvil 22 includes a first leg 26 and a second leg 28 that extends generally perpendicularly away from the first leg 26. The second member 24 includes a leg 30 and a leg 32 preferably connected to the legs 26 and 28, respectively, by suitable fastening means such as a plurality of bolts 34 and 35. The legs 22 and 26 are preferably parallel to the legs 30 and 32, respectively.

As best shown in FIG. 2, the load pad 16 preferably is integrally formed with the leg 26 and has a generally planar surface 40 that abuts the optical fiber 20. The second load pad 18 has a pair of generally parallel planar surfaces 42 and 44. The surface 44 is parallel to the surface 42. The fiber 20 is retained in compression between the confronting surfaces 40 and 44.

Figure 3:
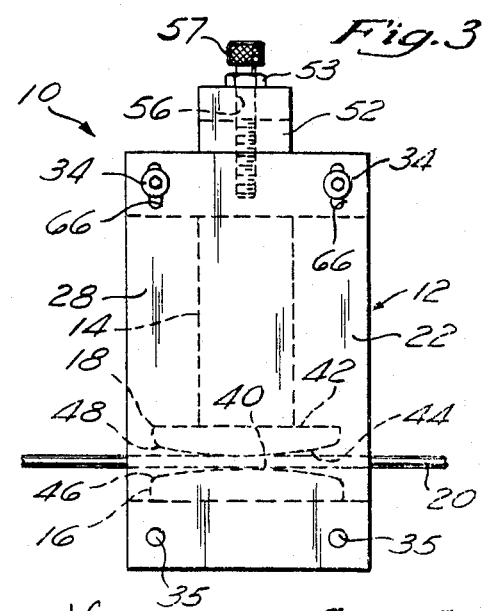
FIG. 3 is a side view of the fiber squeezer of FIGS. 1 and 2 showing the optical fiber retained between a pair of load pads and means for adjusting the preload applied to the fiber.

As best shown in FIG. 3, the surfaces 40 and 44 preferably have rounded edges 46 and 48, respectively, at locations where the fiber 20 enters and exits the squeezer 10. The rounded edges 46, 48 provide gradual application of the compressive force along the length of the fiber 20 to prevent fracturing of the fiber as it enters and exits the squeezer 10.

As best shown in FIGS. 1 and 3, the piezoelectric transducer 14 is retained between the surface 42 of the load pad 18 and a surface 49 of the leg 32 of the member 24 such that the longitudinal axis of the transducer 14 is parallel to the legs 22 and 30. Therefore, application of a suitable voltage across the piezoelectric transducer 14 produces a compressive force to the length of the fiber 20 retained between the the load pads 16 and 18.

Figure 4:
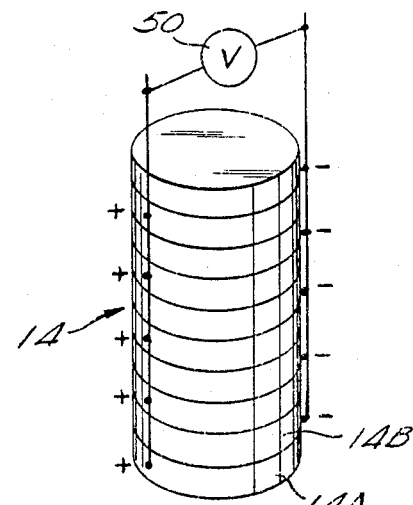
FIG. 4 is a perspective view of the piezoelectric transducer of FIGS. 1 and 2 and a schematic illustration of circuitry for applying voltage thereto.

Referring to FIG. 4, the piezoelectric transducer 14 is preferably formed of a plurality of layers 14A, 14B, etc of a suitable piezoelectric substance such as PZT having a thickness of about 1.0 to 0.5 mm. The layers 14A, 14B, etc. are shown to be circular discs, but they may also be rectangular. A suitable voltage source 50, producing a voltage V, is connected to the layers 14A, 14B, etc such that the electric field in each layer of piezoelectric material is in the same direction. A material having the piezoelectric property expands or contracts in the direction of an externally applied electric field, with a dimensional change proportional to the magnitude of the electric field. For a given voltage V and a layer thickness d, the electric field E is given by E=V/d. Applying the voltage V across each of the thin layers 14A, 14B, etc produces a greater length change in the piezoelectric transducer 14 than would occur if the voltage V were simply applied across the entire length of the piezoelectric transducer 14

Figure 5A:
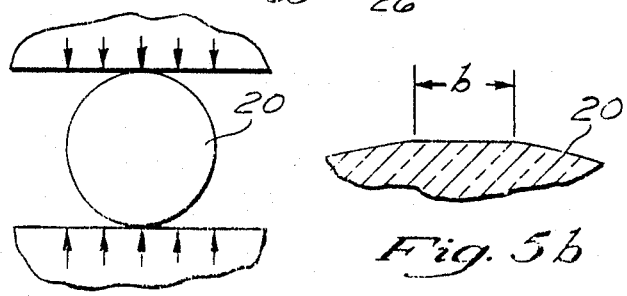
FIG. 5a is a cross sectional view illustrating the distribution of forces applied to the fiber of FIGS. 1–3.

FIG. 5a illustrates the application of a transverse force F to the optical fiber 20 to induce birefringence. A brief explanation of the nature of stress induced birefringence follows to show the relation between the force applied to the fiber 20 and the amount of phase shift produced in the fiber and to show the determination of the amount of preload required for providing control of the phase of optical signals guided by the fiber 20.

Figures 5B, 5C, 5D:
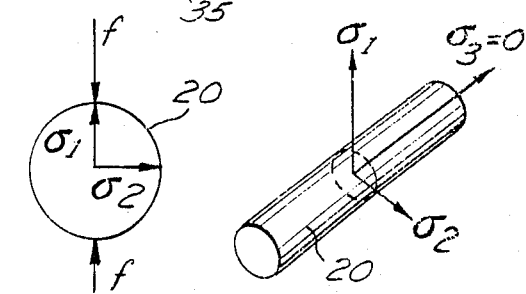

When a force is applied radially inward along the length of a cylinder, the cylinder deforms such that the force is distributed along a length b as shown in FIG. 5b. In the present invention, it is undesirable to fracture the fiber 20; therefore, it is assumed that deformations of the fiber 20 are within its elastic limit. It is well known that a transversely loaded elastic cylinder has a contact region b such that $$b^2 = 2.56\, fd[(1-v_1^2)E_1^{-1} + (1-v_2^2)E_2^{-1}], \quad (1)$$

where
d = fiber diameter;
f = force per unit length on the fiber;
$v_1$ = Poisson's ratio for glass = 0.17;
$v_2$ = Poisson's ratio for steel = 0.27;
$E_1$ = Young's modulus for glass = $6.51 \times 10^{11}$ dyne/cm²; and
$E_2$ = Young's modulus for steel = $2.08 \times 10^{12}$ dyne/cm².

The diameter of the fiber 20 is typically about 75 to 80 μm, and the force per unit length is typically about 6 to 9 N/cm. Taking the fiber diameter to be 75 μm and inserting the numerical values given above into Equation (1) shows that for a force per unit length of 6 N/cm, the contact region $b = 1.495 \times 10^{-4}$ cm = 1.495 μm. For a force of 10 N/cm, the contact region $b = 1.93 \times 10^{-4}$ cm = 1.93 μm.

The calculation shows that the diameter of the fiber 20 is about fifty times greater than the length of the contact region b. Therefore, the applied force can be approximated as a line force as as shown in FIG. 5c. It is well known from standard treatises on elasticity that two mutually perpendicular stresses $\sigma_1$ and $\sigma_2$ result from application of equal and opposite compressive forces to an elastic cylinder. The stresses may be calculated as $$\sigma_1 = -6f/(\pi d) \quad (2)$$

and $$\sigma_2 = 2f/(\pi d). \quad (3)$$

The stresses $\sigma_1$ and $\sigma_2$ given above in Equations (2) and (3) are the principal stresses at the center of the fiber and are parallel and perpendicular, respectively, to the applied force. The directions of the principal stresses are the principal axes of birefringence of the fiber 20.

From the concept of the index of refraction ellipsoid, the optical phase shift $\Delta\theta_\parallel$ parallel to the applied force is $$\Delta\theta_1 = \Delta\theta_\parallel = k_o nl\{e_3 - (n^2/2)(P_{11}e_1 + P_{12}e_2 + P_{12}e_3)\}, \quad (4)$$

where the constants $P_{ij}$ are the photoelastic constants of the fiber 20. The optical phase shift perpendicular to the applied force is $$\Delta\theta_2 = \Delta\theta_\perp = k_o nl\{e_3 - (n^2/2)(P_{12}e_1 + P_{11}e_2 + P_{12}e_3)\}. \quad (5)$$

The induced birefringence, $\Delta\beta$, is the difference between the phase shifts parallel and perpendicular to the optic axis, which is equal to $$\Delta\beta = \Delta\theta_1 - \Delta\theta_2. \quad (6)$$

Using Equations (4) and (5) in Equation (6) gives the induced birefringence in terms of the physical parameters of the fiber; therefore, $$\Delta\beta = -k_o nl\, P_{44}\, (e_1 - e_2). \quad (7)$$

It is necessary to determine the principal strains $e_1$ and $e_2$ to predict the induced birefringence caused by stressing the fiber 20 as explained above. The relation between the strains, the stresses and the Poisson's ratio of the fiber may be expressed in matrix form as $$\begin{bmatrix} e_1 \\ e_2 \\ e_3 \end{bmatrix} = E^{-1} \begin{bmatrix} 1 & -v & -v \\ -v & 1 & -v \\ v & -v & 1 \end{bmatrix} \begin{bmatrix} \sigma_1 \\ \sigma_2 \\ \sigma_3 \end{bmatrix} \quad (8)$$

where the stresses $\sigma_1$, $\sigma_2$, $\sigma_3$ are mutually perpendicular with the stresses $\sigma_1$ and $\sigma_2$ being transverse to the fiber 20 and the stress $\sigma_3$ being axially aligned with the fiber 20 as shown in FIG. 5d. It has been found that the stress $\sigma_3$ along the axis of the fiber 20 is negligible compared to the stresses $\sigma_1$ and $\sigma_2$ transverse to the fiber 20 so that the stresses $e_1$ and $e_2$ may be calculated to be $$e_1 = E^{-1}[\sigma_1 - n\sigma_2] = E^{-1}(6.34 \text{ f})/(\pi d) \quad (9)$$

and $$e_2 = E^{-1}[\sigma_2 - \nu\sigma_1] = E^{-1}(3 \text{ f})/(\pi d). \quad (10)$$

The difference between the stresses $e_1$ and $e_2$ is $$e_2 - e_1 = E^{-1}\{(1-n)(\sigma_1 - \sigma_2)\}, \quad (11)$$

which reduces to $$e_2 - e_1 = -6.102 \times 10^{-10} f \text{ (dynes)}. \quad (12)$$

Equation (7) shows that the required force for a birefringence of $2\pi$ radians is $f = 6.115 \times 10^5$ dynes or 6.115 newtons.

It should be recalled that the expressions and numerical values used above are for D.C. and quasistatic conditions. The fiber squeezer of FIG. 1 has a flat frequency response from D.C. to 10 kHz. When a force of 6 newtons is applied to the fiber 20, the fiber 20 and the piezoelectric transduce 14 must be considered as a single system. If the piezoelectric transducer 14 is a PZT column, the PZT must develop a force of about 20.4 newtons to deliver a force of 6.1 newtons to the fiber 20. If the blocked force developed by the PZT is denoted $F_B$ and the force on the fiber is denoted $F_f$, the approximate relation between the blocked force developed by the PZT and the force actually delivered to the fiber 20 is $$F_f \approx 0.3 F_B. \quad (13)$$

The factor of 0.3 derives from the compliance of the PZT, the fiber 20 and the frame acting as an elastic system.

In order to provide complete control of the polarization of an optical signal propagating in the fiber 20, an axial preload is imposed upon the piezoelectric transducer 14. The axial preload establishes a quiescent point so that both increases and decreases in the axial loading of the piezoelectric transducer 14 will have an effect on the polarization of the signal.

The frame 10 and the piezoelectric transducer 14 must support a selected preloading so that the piezoelectric transducer 14 may be actuated to compress the fiber 20 to produce a desired birefringence for changing the polarization of an optical signal guided by the fiber 20. It has been found that a length of optical fiber under lateral compression by the piezoelectric transducer 14 will produce a polarization retardation of the optical signal proportional to the electric field applied to the piezoelectric transducer 14. The applied preloading may be a predetermined static load or a variable preload determined by a pressure sensing device that correlates applied load with polarization retardation.

Referring to FIGS. 1–3, 6 and 8, a spring plunger device 51 preloads the fiber 20 in compression between the load pads 16 and 18. The spring plunger device 51 includes an L-shaped mounting bracket 52 that mounts to an end of the leg 30 and extends over the leg 32. A mounting screw 53 secures the spring plunger device 51 to the leg 28. A threaded passage 56 in the mounting bracket 52 is located above the leg 32 coaxial with the piezoelectric transducer 14. Referring to FIG. 8, a screw 57 engaged in the threaded passage 56 includes a hollow chamber 58 therein to mount a coil spring 59 and includes a hollow shaft 63 that holds a plunger 60. The coil spring biases 59 the plunger 60, which has an end 61 that ordinarily projects from an end 62 of the screw 57. The spring 59 is calibrated so that a known force is required to move the plunger 60 into the chamber 58. The screw is advanced toward the outer surface of the leg 32 with force sufficient to move the plunger 60 into the chamber 58.

As shown in FIGS. 1–3, the bolts 34, 35 are inserted through corresponding passages 66, 68 in the legs 28 and 30, respectively. The bolts 34 are threadedly engaged in a passage 69 in the leg 32, and the bolts 35 are threadedly engaged in a passage 70 in the leg 26. The passages 66, 68 are somewhat elongate as shown in FIGS. 1–3 to provide adjustment of the position of the member 22 relative to the member 24.

It has been found that a static preload of about 20 newtons on the frame 12 provides a suitable quiescent operating point for the piezoelectric transducer 14 for controlling the polarization of optical signals guided by the fiber 20. Application of 20 newtons to the frame to laterally compress the fiber 20 results in a pressure of about 125,000 psi being applied to a length of approximately 0.50 inch of the fiber 20. This pressure causes a strain of about $0.12\mu$. After the desired preload is applied to the frame 12 by advancing the suitably calibrated spring plunger device 51 toward the leg 32 by the proper amount, the bolts 34, 35 are securely tightened without disturbing the longitudinal geometry of the fiber squeezer 10. After the bolts 34, 35 are secured, the mounting screw 53 may be removed from the leg 28.

The 20 newton preload may be safely applied to the fiber 20, which has a typical breaking load greater than 40 newtons. The breaking load corresponds to a pressure of about 180,000 psi in the fiber, well above the actual pressure applied to the fiber 20. In order to achieve polarization changes of $\pm 2\pi$ in the optical signal guided by the fiber 20, the piezoelectric transducer 14 must either expand or contract to increase or decrease the force on the fiber 20. The piezoelectric transducer 14 and the voltage source V may conveniently be formed to cooperate to apply an additional seven newtons to the fiber 20 and to contract to reduce the force on the fiber 20 to thirteen newtons. Therefore, the fiber squeezer 10 operates to provide forces of $\pm 7$ newtons about the 20 newton quiescent point.

FIGS. 6 and 7 illustrate a second frame 71 for retaining the fiber 20 with a selected preload. The frame 71 includes a base portion 72 formed generally as a U-shaped member having outwardly extending legs 74 and 76. An end plate 78 may be connected between the legs 74, 76 by suitable bolts 80 to retain the piezoelectric transducer 14 and the fiber 20 in lateral compression between the pair of load plates as described with reference to FIGS. 1–3. The end plate 78 includes a pair of passages 82 through which the bolts 80 extend.

As best shown in FIG. 7, the diameter of the passage 82 is larger than the diameter of the bolt 80 to provide a clearance for permitting adjustment of the compressive force on the fiber 20. As shown in FIG. 6, the spring plunger device 51 is used to preload the fiber 20 in a manner similar to that described with reference to FIGS. 1–3. After the fiber is preloaded by the spring plunger device 51, the bolts 80 are secured to the frame 70 to maintain the force on the fiber 20.

FIG. 9 illustrates three fiber squeezers 82–84 mounted upon a single fiber 86 to form a polarization controller 88. The squeezers 82–84 are mounted upon bases 86–88, respectively. The fiber squeezer 82 has a leg portion 90 that rests upon a planar inclined surface 94 of the base 86 such that the longitudinal axis of the squeezer is inclined 22.5° clockwise from the vertical. The squeezer 84 is mounted on surface 96 of the base 88. The surfaces 94 and 96 are parallel so that the axes of the squeezers 82 and 84 are parallel. The squeezer 83 is mounted on a surface 98 oriented 45° counterclockwise from the surfaces 94 and 96. Therefore, the longitudinal axis of the squeezer 83 makes an angle of 45° with the longitudinal axes of the squeezers 82 and 84.

The axes of the squeezers 82–84 are oriented as shown in FIG. 9 and described above because it has been found that, in general, to provide complete control of the polarization of an optical signal guided by the fiber 86, the fiber squeezers 82 and 84 should apply parallel compressive forces to the fiber, and the force of the fiber squeezer 83 should be at an angle of 45° to the force of the fiber squeezers 82 and 84. A suitable control system (not shown) monitors the polarization input to and output from the polarization controller 88 to regulate the amount of voltage to be applied to each fiber squeezer 82–84. If the fiber 86 is not birefringent, it is possible to use only the fiber squeezers 82 and 83 to control the polarization of the optical signal guided by the fiber 86. In actual practice, the fiber 86 is always somewhat birefringent so that all three fiber squeezers 82–84 are required.

FIG. 10 graphically illustrates the relation between the load on the fiber 20 in the quiescent state when only the preload is applied and the load that is applied by one of the fiber squeezers. The quiescent state is referred to as "phase one" and the other loaded condition is referred to as "phase two". The graphs are not to scale. Actually the graph for phase one is nearly horizontal, and the graph for phase two is nearly vertical. In FIG. 10 the symbol K represents the structural spring rate of the system under compression.

The invention provides a bimodular structural system that allows a step transition between the two distinct phases. Phase one is a "soft" preloading that can be easily adjusted without fracturing the fiber 20. The first phase, due to its softness, allows for sensitive loading and prevents fracture of the fiber.

Phase two is a stiff system that effectively directs the signal deflections into the fiber to provide polarization control. The step transition form the first phase to the second phase is achieved by clamping action of the device applied transversely to the preload force. Since the relative geometry of the structure is maintained, system tension is undisturbed, avoiding any change or bias to the initial load.

What is claimed is:

1. A squeezer for applying a transverse compressive force to a length of an optical fiber, comprising:
   a first L-shaped member;
   a second L-shaped member connected to said first L-shaped member;
   a transducer including a column of piezoelectric material retained between said first and second L-shaped members, the length of optical fiber being retained between said first L-shaped member and said transducer;
   means for applying a predetermined transverse compressive preload force to said length of optical fiber; and
   means for actuating said transducer by applying a control voltage to said column of piezoelectric material to selectively increase or decrease the compressive force on said optical fiber.

2. Apparatus according to claim 1, further including:
   a first load pad mounted on said first L-shaped member; and
   a second load pad mounted to said transducer such that said length of optical fiber is retained between said first and second load pads, both of said first and second load pads having opposing planar portions that include edges formed to diverge at locations proximate to where said length of optical fiber enters and exits the region between said first and second load pads.

3. A squeezer for applying a transverse compressive force to a length of an optical fiber, comprising:
   a first L-shaped member;
   a second L-shaped member connected to said first L-shaped member;
   a transducer retained between said first and second L-shaped members, a length of optical fiber being retained between said first L-shaped member and said transducer;
   means for applying a predetermined transverse compressive preload force to said length of optical fiber; and
   means for selecting said predetermined force to be applied to said length of optical fiber.

4. Apparatus according to claim 3 wherein said selecting means includes fastening means configured for engagement with one of said L-shaped members, the other of said L-shaped members having a passage therethrough for receiving said fastening means therein for securing said L-shaped members in abutment, said passage providing a range of adjustment of the positions of said L-shaped members relative to one another.

5. A polarization controller having three fiber squeezers mounted upon a single optical fiber, comprising;
   a base;
   a first fiber squeezer having a longitudinal compression axis inclined at a selected angle relative to the base;
   a second fiber squeezer having longitudinal compression axis inclined 45° from the first fiber squeezer;
   a third fiber squeezer having longitudinal compression axis parallel to that of the first fiber squeezer;
   each of the first, second and third fiber squeezers including;
   a first L-shaped member for connection upon a first planar inclined surface of the base;
   a second L-shaped member connected to the first L-shaped member;
   a transducer retained between said first and second L-shaped members, the length of optical fiber being retained between said first L-shaped member and said transducer; and
   means for applying a predetermined transverse compressive preload force to said length of optical fiber;
   means for mounting the first, second and third fiber squeezers sequentially next to one another along the optical fiber;

means for regulating the amount of pressure each fiber squeezer exerts on the optical fiber; and means for actuating said transducer to selectively increase of decrease the compressive force on said optical fiber.

6. A method for controlling the birefringence of a length of optical fiber, comprising the steps of:

placing the length of optical fiber between a first L-shaped member and a transducer;

mounting a second L-shaped member with said transducer and said optical fiber being retained between said first and second L-shaped members being moveable relative to one another;

applying a known compressive force to said first and second L-shaped members to compress said transducer and said length of optical fiber therebetween such that a predetermined compressive load is applied to said length of optical fiber to provide a predetermined birefringence in said length of optical fiber; and securing said first and second L-shaped members together to retain said predetermined compressive loading upon said length of optical fiber after said known compressive force is removed from said L-shaped members.

7. The method of claim 6, further including the step of mounting said length of optical fiber between a pair of load pads connected between said transducer and said first L-shaped member.

8. The method of claim 6, further including the step of selectively expanding or contracting said transducer to vary the compressive load on said length of optical fiber above or below said predetermined compressive load to control the birefringence of said length of optical fiber.

9. The method of claim 8, further including the step of mounting said length of optical fiber between a pair of load pads connected between said transducer and said first L-shaped member.

10. A method for applying a transverse compressive force to a length of an optical fiber, comprising the steps of:

placing the length of optical fiber between a first L-shaped member and a transducer;

mounting a second L-shaped member to said first L-shaped member with said transducer and said optical fiber being retained between said first and second L-shaped members, said first and second L-shaped members being movable relative to one another;

applying a known compressive force to said first and second L-shaped members to compress said transducer and said length of optical fiber therebetween such that a predetermined compressive load is applied to said length of optical fiber to provide a predetermined birefringence in said length of optical fiber;

securing said first and second L-shaped members together to retain said predetermined compressive loading upon said length of optical fiber; and actuating said transducer to selectively increase or decrease the transverse compressive force applied to said optical fiber.

11. A method for controlling the polarization of light guided by an optical fiber comprising the steps of:

providing a base;

providing a first fiber squeezer having a longitudinal compression axis inclined at a selected angle relative to the base;

providing a second fiber squeezer having a longitudinal compression axis inclined 45° from the first fiber squeezer;

providing a third fiber squeezer having a longitudinal compression axis parallel to that of the first fiber squeezer;

forming each of the first, second and third fiber squeezers by the steps of:

connecting a first L-shaped member upon a first planar inclined surface of the base;

connecting a second L-shaped member to the first L-shaped member;

retaining a transducer between said first and second L-shaped members so that the length of optical fiber is retained between said first L-shaped member and said transducer; and applying a predetermined transverse compressive preload force to said length of optical fiber;

mounting the first, second and third fiber squeezers sequentially next to one another along the optical fiber;

regulating the amount of pressure each fiber squeezer exerts on the optical fiber; and actuating said transducer to selectively increase of decrease the compressive force on said optical fiber.

* * * * *